Figure 1:
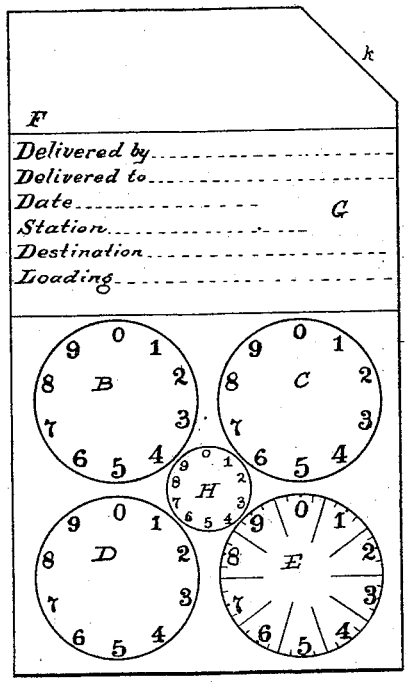

(No Model.)

C. C. GALE, R. COWLES & A. W. DAVIES.
CAR MILEAGE REPORT.

No. 455,197. Patented June 30, 1891.

WITNESSES;
M. B. Vorce
L. Prentiss

INVENTORS;
Charles C. Gale,
Royal Cowles,
Alexander W. Davies
by C. M. Morey
Atty

UNITED STATES PATENT OFFICE.

CHARLES C. GALE, ROYAL COWLES, AND ALEXANDER W. DAVIES, OF CLEVELAND, OHIO, ASSIGNORS TO SAID GALE AND SAID DAVIES, AND EDWARD C. GARLICK AND CARL C. HARRIS, OF SAME PLACE.

CAR-MILEAGE REPORT.

SPECIFICATION forming part of Letters Patent No. 455,197, dated June 30, 1891.

Application filed July 12, 1890. Serial No. 358,538. (No model.)

*To all whom it may concern:*

Be it known that we, CHARLES C. GALE, ROYAL COWLES, and ALEXANDER W. DAVIES, citizens of the United States, residing at Cleveland, in the county of Cuyahoga and State of Ohio, have invented certain new and useful Improvements in Car-Mileage Reports; and we do hereby declare the following to be a full, clear, and exact description of the invention, such as will enable others skilled in the art to which it appertains to make and use the same.

The object of our invention is to make and preserve a record of the mileage of cars and locomotives, of the life and service of car-wheels, and of the routes traversed and the companies or firms handling or using the cars, and of such other information as may be desirable in connection therewith.

It is well known that in the railroad business locomotives and cars often travel long distances away from what is known as their "home road"—that is, the road for which they are built and by the owners of which they are owned. In the case of freight-cars such distances sometimes exceed a thousand miles. Mileage accounts are kept by all railroad companies for the purpose of collecting from every other road its proportion of the mileage due for the use of each of its cars while on such road, and similar accounts are kept for its own protection by each company of the mileage on its own road of all cars of other roads. At present such mileage accounts are made up from reports furnished daily or oftener by the conductors of trains and by station-agents at junction points, who report the delivery of cars to connecting-lines, and to enable all roads in interest to keep their mileage accounts what are known as "junction-cards" are used, on which are stated the numbers of all cars belonging to each road and to what other road each car was delivered, and these cards, made by employés charged with that duty, are furnished daily to the company owning the car by the one delivering it. An immense clerical force is required for the work, entailing great expense on every railroad company, and owing to the haste and unfavorable circumstances—such as darkness and storms—under which the work of taking down the particulars of the reports by conductors, &c., is done errors in the reports are very numerous.

The imperfections and errors of the present methods are so great that cars are continually being lost trace of when off their home road, and a force of men is constantly employed as car-tracers in traveling and searching out the whereabouts of lost cars and procuring the same to be returned to their home road. Errors in recording the number and description of the car, owing to illegible writing or partial defacement of the various reports are a prolific cause of such losing trace of cars and results in a great loss of mileage, estimated by railroad authorities to amount to many thousands of dollars each year to every important road. To avoid all such errors and loss is a part of the purpose and object of our invention.

Another very important reason for keeping a correct record of the mileage of cars is found in the present system on which car-wheels are purchased. Freight-car wheels are sold on a guarantee of a certain time of service, and locomotive and passenger-car wheels are guaranteed to perform a certain mileage irrespective of time. In case a wheel wears out before fulfilling its guarantee the maker is compelled to make good the difference; but if it serves out its guarantee the maker receives nothing for its further service, which may extend over a long period. The temptation on the part of the maker, therefore, is to make a wheel which will not much outlast its guaranteed service. Attempts to regulate the price of freight-car wheels by the actual mileage service of the wheels have not heretofore been successful, on account of the difficulty in obtaining correct and satisfactory records of the mileage, and to provide the means for keeping exact record of the mileage of car-wheels and their time of service is a further part of the object of our invention.

The invention consists in a sheet of suitable material, which, while giving other desired information, is adapted to have automatically impressed upon it by suitable mechanism attached to the car characters or symbols, which, in connection with printed matter on the sheet, shall indicate in permanent manner the number and ownership of the car, its description, and its mileage, and which sheet shall be at once convenient for transmission as a report and adapted for preservation as a permanent record. By such automatic record the possibility of error is avoided in the essential part of the report—viz., the number and ownership of the car and its mileage. It is a part of our invention to make such record simultaneously in duplicate, triplicate, or even greater numbers, to the end that duplicates of the record made may be furnished to all such parties as may be interested in the information so recorded, and thus serve in a better way the purposes of the junction-cards now used, and to aid in transmitting each duplicate of the record to its appropriate recipient we propose to use distinguishing-colors for the separate reports.

We prefer to employ as the material for the record light card-board; but any substance may be used which is capable of being formed and preserved in sheets and of receiving and retaining an impression. On the card or sheet of other material we print or impress such words, figures, or symbols as may be adapted to express the information required when read in connection with the marks or impressions subsequently to be made, and so arrange the printed matter on the sheet that when placed in the apparatus, presently to be described, and an impression taken therefrom such impression shall occur in such relation to the previously-printed matter as to indicate the data required.

The drawings illustrate a method of carrying out our invention.

Figure 2:
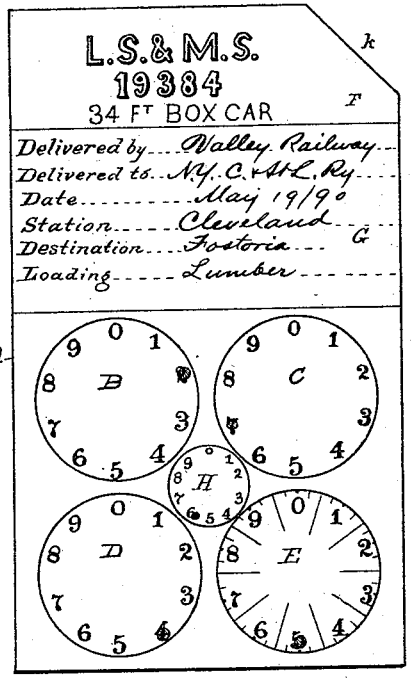
Figure 3:
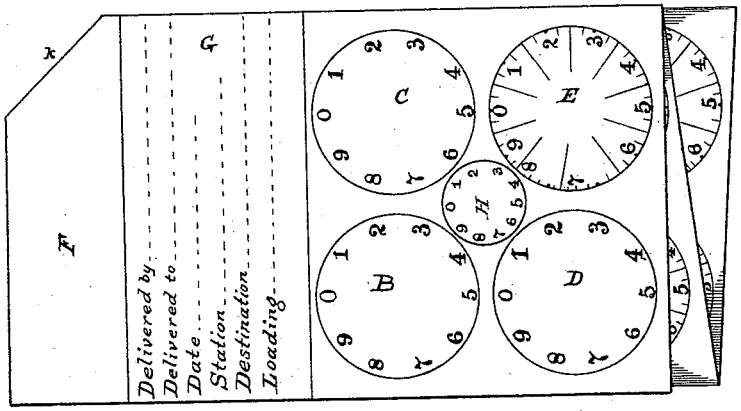

Figure 1 represents the sheet in its simplest form as prepared for use and before the impression is taken. Fig. 2 represents the same after use with the record made thereon. Fig. 3 represents the sheet in three folds as prepared for taking the record in triplicate, in which case each fold will bear a distinguishing-color or other distinguishing-mark.

A represents the record-sheet.

B C D E H are graduated circles printed thereon, forming the record of the miles traveled by the car.

F represents a space, within which is to be impressed the particulars as to the number, style, and ownership of the car.

G represents a space, within which may be stated any other information desired, such as the date of making the transfer, to whom delivered, condition of car, whether loaded or unloaded, its destination, &c. The relative location or size of the various spaces may of course be varied, if desirable.

To make the mileage record, a device known as a "car-mileage indicator" is used. The indicator consists of a series of multiplying-gears which form a meter of the usual kind, indicating decimally the miles traversed. The meter is inclosed in a case attached to the car and is connected with one of the axles of the car in such manner that the number of miles traveled by the car is indicated by the dials of the meter, which are rigid with their pinions, and are so arranged that when read in their order they express the total mileage. Thus in the drawings the figures in the dial B represent tens of thousands; C, thousands; D, hundreds; E, tens, and H units, the units of the dial E being ten miles, although a different arrangement of dials might be adopted, if preferred. At some determinate point, preferably the zero-point, on each dial of the meter is arranged a pin or projecting point adapted to puncture or impress the record-sheet when brought in contact with it, and by any appropriate means the record-sheet is inserted in the indicator-box and forced into contact with these points when it is desired to make the mileage-record. The printed dials on the sheet A are arranged in such position that when the sheet is inserted in its proper position in the indicator-box its dials will correctly correspond in position with those of the meter—that is, the dial of the record-sheet indicating tens will correspond in position with that dial of the meter which indicates tens, and so with the other dials. To insure the entering of the record-sheet in its proper position in the indicator-box, it is preferably made of rectangular form with one corner cut away, as seen at $k$ in the drawings, and the space to receive it is made of the same shape, so that it will only fully enter the box in one position. The same end may be accomplished by providing notches in the upper edge of the sheet and blocks or pins to enter the same; but we do not limit ourselves to any particular method of securing the correct register of position of the sheet when inserted in the indicator-box.

In order to make the impression in the sheet, either the meter is arranged to slide in its case or the mechanism holding the record-sheet is arranged to slide, and by means of a lever, wedge, cam, or suitable mechanism the sliding part is forced against the stationary part, after inserting the sheet, to impress the same and form the record.

To obtain simultaneously with the record of the mileage a record of the number, style, and ownership of the car, a stamp or type plate bearing letters, figures, or symbols adapted to express the same is affixed to the meter-frame, so as to project in the same plane as the points on the meter-dials, and this type-plate of course impresses the record-sheet at the same time as the meter-dials.

Fig. 2 shows in the space F such an impression as made by the type-plate and in the space G the record, written at the time of taking the impression-record, of the station at which the record was made, to whom delivered, its loading, &c. Space may be provided for the addition of any other data it is desired to preserve.

To obtain the record in duplicate, we prefer to make the record-sheet in two or more folds, each of a distinguishing-color and containing the same printed matter in the same position on each fold, and to insert it so folded and form the impression in all the folds at once, after which the sheet is severed along the line of the folds and furnishes as many originals of the record as it has folds. The position of the marks on the record-dials gives the reading of the mileage. As shown in Fig. 2, the record shows that the car described had traveled since the meter attached to it was set at zero the distance of twenty-seven thousand four hundred and fifty-six miles.

The method of using our invention is as follows: The person charged with the duty of making the mileage report, usually at junction points, is provided with a supply of the record-sheets and with means for operating the indicator to obtain the impression. He proceeds to insert one of the sheets in the indicator-box attached to each car and impress the same to record the mileage, &c., adding such other data as may be desirable. When the record impression from each car has been secured, they are assorted, the duplicate parts separated, and each part sent to its proper recipient, the distinguishing-colors of the different folds preventing mistake in this respect. Any other distinguishing-mark than color may be used for this purpose; but we regard color as the simplest and most effectual. When a worn-out wheel is replaced by a new one, an impression of the mileage shown by the indicator is taken in the same way, and when the new wheel is in turn worn out an impression then taken from the same indicator will furnish an accurate record of the mileage it has accomplished.

Having fully described our invention, what we claim as new, and desire to secure by Letters Patent, is—

1. A car-mileage report consisting of a sheet of impressible material having thereon symbols or designs adapted to express car-mileage when impressed by the dials of a mileage meter or indicator, substantially as described.

2. A car-mileage report consisting of a sheet of impressible material having imprinted thereon designs or symbols, which when impressed by the dials of a mileage-indicator, shall constitute a record of car-mileage, substantially as described.

3. A car-mileage report consisting of a sheet of impressible material adapted to be inserted into a mileage-indicator in a particular position and having thereon symbols or designs adapted to express car-mileage when impressed in such position by the dials of the indicator, substantially as described.

4. A car-mileage report consisting of a folded sheet of impressible material having on each fold symbols or designs adapted to express on each fold the same record of mileage when simultaneously impressed by the dials of a mileage-indicator, substantially as described.

5. A car-mileage report consisting of a folded sheet of impressible material having each fold of a distinguishing-color and having on each fold symbols or designs adapted to express on each fold the same record of mileage when simultaneously impressed by the dials of a mileage-indicator, substantially as described.

6. A car-mileage report consisting of a sheet of impressible material having printed thereon dials corresponding to the dials of a mileage-meter and adapted, by being punctured or impressed by the dials of the meter, to express and record the mileage indicated by such meter, substantially as described.

7. A car-mileage report consisting of a sheet of impressible material having thereon dials or other symbols to express mileage and blank spaces for the impression of dies designating car-numbers and other information, all adapted to express the mileage and other information when impressed by means of a mileage-indicator, substantially as described.

8. A car-mileage report consisting of a sheet of impressible material having thereon printed dials, printed blanks, and blank spaces, such dials and spaces being adapted to express the mileage and other information by means of impressions from a mileage-indicator, and such printed blanks adapted to be filled by writing, substantially as described.

9. A car-mileage-report sheet having thereon symbols adapted to express car-mileage by means of impressions formed thereon by a mileage-indicator, and notched or cut away, as described and shown, whereby its shape is made to conform to the receptacle of the indicator and adapt it to enter the same only in the position for properly receiving the impression, substantially as described.

In testimony whereof we affix our signatures in presence of two witnesses.

CHARLES C. GALE.
  ROYAL COWLES.
  ALEXANDER W. DAVIES.

Witnesses:
 MARY SNYDER,
 WM. G. TAYLOR.